Figure 1:
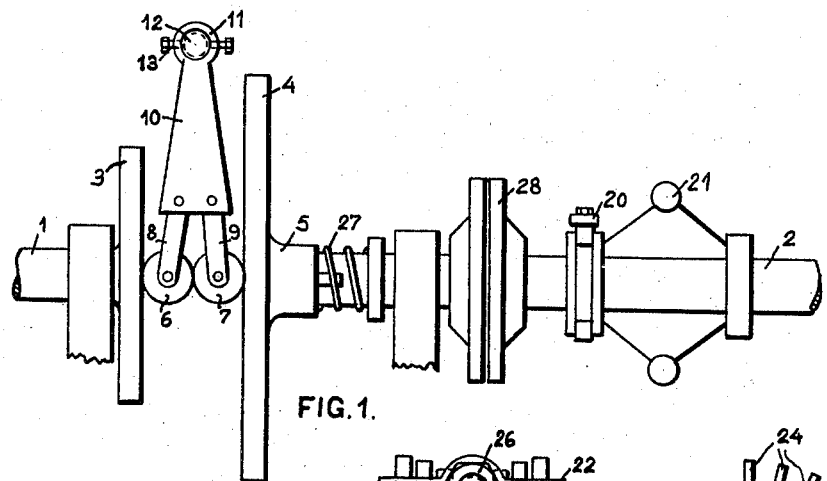

May 15, 1951        J. J. VAN LEEUWEN        2,552,751

VARIABLE-SPEED FRICTION GEAR

Filed Oct. 14, 1948        2 Sheets-Sheet 1

Inventor
J. J. van Leeuwen
By Gliscock Downing Kuebla
Attys.

May 15, 1951  J. J. VAN LEEUWEN  2,552,751
VARIABLE-SPEED FRICTION GEAR
Filed Oct. 14, 1948  2 Sheets-Sheet 2
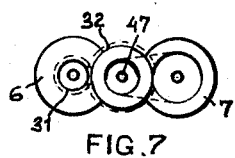
FIG. 7
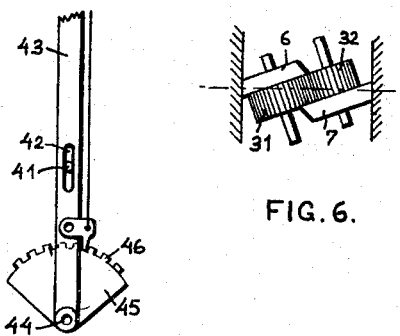
FIG. 6.
FIG. 8.
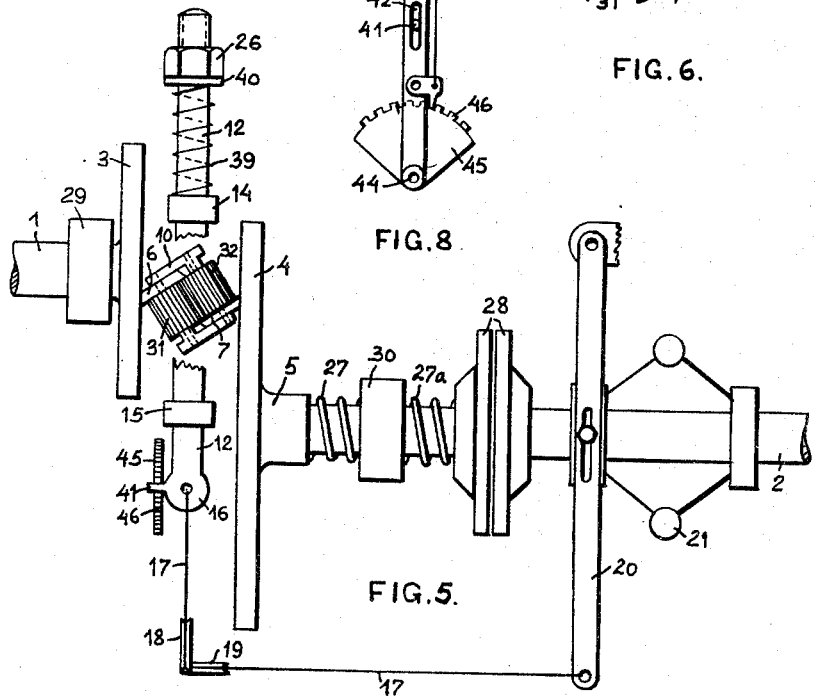
FIG. 5.
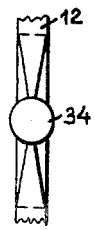
FIG. 9.
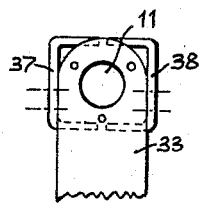
FIG. 10.
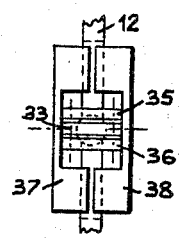
FIG. 11.
Inventor
J. J. van Leeuwen
By Hazard Downing Diebold
Attys Patented May 15, 1951

2,552,751

UNITED STATES PATENT OFFICE 2,552,751

VARIABLE-SPEED FRICTION GEAR

Jacobus Joannes van Leeuwen, Amsterdam, Netherlands

Application October 14, 1948, Serial No. 54,447
In the Netherlands February 6, 1946

6 Claims. (Cl. 74—190.5)

My invention relates to a variable speed friction gear, comprising two main gear discs, spaced apart and mounted rotatably and excentrically opposite one another, one of which being coupled with the driving spindle and the other with the driven spindle and between which a set of mutually coupled friction wheels is arranged, which is radially displaceable with respect to both gear discs and of which one of the friction wheels cooperates with one of the main gear discs and the other with the other main gear disc. Such friction gears are already known. In a known construction of this kind the two friction wheels are mounted on a common spindle and are thus coupled for rotation in the same sense. For obtaining a compensation of the forces acting on the set of friction wheels, in such a construction the friction wheels must be large and the common spindle of the set has to make a sharp angle with the direction of the two spindles of the main gear discs. This causes inevitably that the friction wheels lie against the main gear discs with relatively large surfaces, while the touching plates of the two friction wheels with the main gear discs lie relatively far apart in radial direction, which necessitates a very heavy connection and displacing construction for the set of friction wheels and makes the control by a governor impossible.

The invention now aims at providing a variable speed friction gear of the kind described above, which can be easily controlled with very little forces, more particularly directly by a governor without declutching the friction wheels from the main gear discs.

To this purpose according to the invention in the first place the friction wheels are mutually coupled for rotation in opposite sense. In this way the possibility is obtained, under maintenance of the compensation of forces which prevents tipping of the set of friction wheels between the main gear discs, to use small friction wheels, the spindle of which standing perpendicular to the direction of the two main gear spindles or making a sharp angle with the surfaces of the main gear discs and standing in the direction of the connecting line of the centers of these discs, whereby a minimum of wear can be obtained.

Simple and appropriate constructions can be obtained if the friction wheels of the set of friction wheels are mounted on mutually parallel spindles. The compressive forces between the main gear discs and the set of friction wheels then stand perpendicular to the disc surfaces, whereby at the same time the tipping tendencies of the set of friction wheels can easily be mastered and a relatively light and easily controllable control mechanism can be used.

Using the above mentioned favourable circumstances, further according to the invention, for attaining the aimed purpose, the set of friction wheels is fixed to a housing, which is hanged between the two main gear discs swingingly in the direction of displacement of the set of friction wheels, on a control rod, which itself is mounted displaceably in its axial direction. In this way it will be obtained that on displacing the friction wheels no friction has to be overcome, as a displacement of the control rod in one direction or one other, only that the housing with the friction wheels is somewhat tipped outward or inward, after which the friction wheels will roll outward respectively inward on the main gear discs, in consequence of the rotation of these discs, until the housing stands again perpendicularly under the point of suspension on the control rod. This construction is particularly adapted for use of a governor control and can also be used for high capacity gears.

For preventing undesired swinging movements, the housing with the set of friction wheels is appropriately connected to the control rod in a restrictedly swinging manner.

A very simple and efficient construction can be obtained if the friction wheels are made running directly against one another and are connected to the housing with at least one hinged arm. The friction wheels are then always automatically pressed against one another and against the main gear discs with the same pressure as the coupling pressure exercised on the main gear discs, so that wear has no influence on the working of the gear.

Further according to the invention, the friction wheels can be coupled with one another with the aid of a transmission, eventually with one or more intermediate spindles. The transmission, furthermore can appropriately consist of a tooth wheel transmission. In such a construction the tooth wheels can be of equal or unequal diameter, so that, besides a simple transmission with opposite sense of rotation, at the same time also as desired or as wanted, by choice of the transmission ratio, a multiplication or reduction gear can be obtained.

Figures 3, 4:
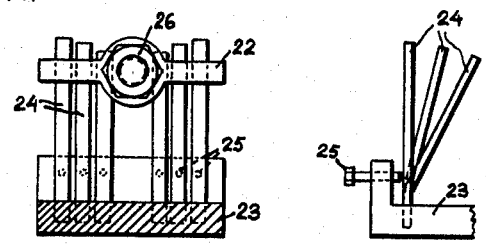
Figure 2:
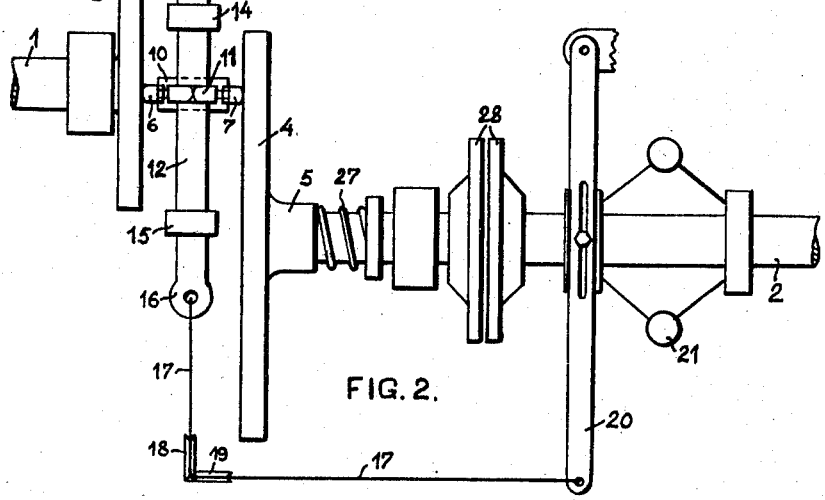

As the usual governors, more particularly centrifugal governors, have generally a square characteristic curve, whereas for many applications of a gear according to the invention a linear or other shaped characteristic curve of the governor will be necessary, the gear according to the invention can be provided with means for correcting the characteristic curve, more particularly by that the control rod which is connected with the governor, cooperates with a system of adjustable return springs, which will be brought into action after one another when the control rod is displaced from the rest position. The invention will now be described with reference to the drawings, in which some more or less diagrammatic examples of construction are shown. In the drawing:

Fig. 1 shows a side elevation of a variable speed friction gear with a clutch coupling and governor control according to this invention, Fig. 2 shows a top elevation of Fig. 1, Fig. 3 shows an end view of the return means of the control rod and Fig. 4 shows a side elevation of Fig. 3, Fig. 5 shows a top view of another variable speed friction gear according to the invention, Fig. 6 shows a set of friction wheels according to the invention with multiplication or reduction tooth wheel transmission, Fig. 7 shows a set of friction wheels with tooth wheel and chain transmission and intermediate spindle, Fig. 8 shows a side elevation of the mechanism for the manual displacement of the control rod and Figures 9, 10 and 11 show details of the limited swinging connection of the housing of the friction wheels used in the embodiment of Fig. 5.

In the drawing 1 and 2 are the two rotatably mounted main gear spindles, which are mutually excentric and carry mutually parallel main gear discs 3 and 4. The disc 4 is in this case slidably but unrotatably mounted on the driven spindle 2 with the boss 5. Between the two discs 3 and 4 there is a set of friction wheels 6 and 7, which is mounted on mutually parallel spindles standing perpendicular to the two gear spindles and the wheels of which running directly against one another and mutually coupled for rotation in opposite sense. The two friction wheels 6 and 7 are secured two arms 8 and 9, which are in turn hinged to a housing 10. The housing 10 possesses at the top an eye 11 with which it is swingingly suspended between the discs 3 and 4 on a control rod 12, for instance by that the control rod is locally provided with a circumferential groove of small depth, in which lie two bolts 13, which reach laterally to the inside through the ring 11, which fits with some play round the control rod. The edges of the ring at the same time serve for limiting the swinging range of the housing with the set of friction wheels.

The control 12 is displaceably mounted in its axial direction in two bearings 14 and 15 and in this case it is connected at one end 16 with a cable 17, which is led over two rollers 18 and 19 and fixed with the other end to a regulating lever 20 of a centrifugal governor 21.

At the other end, for the return movement, the control 12 is provided with a transverse bar 22, which cooperates with a set of plate springs 24, which are clamped beside each other with one end in a frame part 23, or secured to it in any other suitable way. The plate springs 24 can be adjusted with respect to their mutual position by means of adjusting screws 25, whereby the characteristic curve of the regulation of the whole device can be chosen as desired or as wanted. Furthermore the transverse bar 22 is adjustable on the control rod 12 by means of the adjusting nut 26, whereby the rest position of the device can be adjusted.

Between the governor 21 and the main gear disc 4 furthermore a spring 27 is mounted round the spindle 2, which spring gives the coupling pressure of the variable speed gear, as well as the coupling pressure of the clutch coupling 28. The clutch coupling 28 serves for declutching the driven spindle 2 with running driving spindle and varible speed gear, which could be of interest, for instance for driving motorcars.

In the embodiment according to Fig. 5 the driving gear spindle 1 and the driven gear spindle 2 are rotatably mounted in fixed bearings 29 and 30 and each spindle carries a main gear disc 3 resp. 4. Between the two discs 3 and 4 is again arranged a set of friction wheels 6 and 7. The friction wheels are mounted in a housing 10 with their spindles mutually parallel and at the same time parallel to the connecting line of the centers of the two main gear discs. The housing 10 is supported in such a manner that the housing can perform a limited rocking movement between the two main gear discs. The two friction wheels 6 and 7 are mutually coupled for rotation in opposite sense by a set of tooth wheels 31 and 32 having the same diameter in this case. The arrangement is constructed in such a manner, that the touching places of each of the friction wheels with each of the adjacent gear discs lie opposite in the direction of the two main gear spindles, so that tipping tendencies of the set of friction wheels are restricted to a minimum.

For the fixation to the control rod 12, the housing 10 possesses at the top a transverse rib 33 (Fig. 10) with an eye 11. This eye fits round a ball shaped member 34 (Fig. 9) of the control rod 12 and is maintained on this member by means of two hollowed rings 35 and 36 (Fig. 11), which are secured to the rib 33 on both sides of the eye 11. For limiting the rocking or swinging movements of this fixation round the ball and socket joint, furthermore a pair of shields 37 and 38 are fixed to the rib 33, lying laterally against the side walls of the control rod 12, which has a square cross section on both sides of the ball 34, and embracing the control rod with some play at the upper and bottom side of it. In consequence the housing 10 can practically only swing in the plane through the control rod and the center line of the housing, and yet only so far as the end walls of the shields 37 and 38, which are bent inward, will tolerate the movement. The control rod 12 is mounted slidably in its axial direction in the middle over the two main gear discs 3 and 4 in bearings 14 and 15. When the rod is displaced in one direction or the other, the housing 10 with the friction wheels 6 and 7 will be tipped or rocked, which will cause, when the variable speed gear is turning, that the friction wheels 6 and 7 will roll in the direction in which the housing is tipped over the main gear discs, and therefore will move outward or inward, until they stand again vertically under the point of suspension of the housing 10. These displacements therefore necessitate no large forces, while also no wear arises. In consequence this construction is very suitable for automatic control by means of a governor.

In the shown embodiment a centrifugal governor 21 is used with a regulating lever 20, which is connected with one end 16 of the control rod 12 by means of a cable 17 running over guide pulleys 19 and 18. For the return movement the control rod 12 is provided at the other end with a spring 39, which presses against the bearing 14 on one hand and against the ring 40 with adjusting nut 26 on the other hand. The coupling pressure for the variable speed friction gear is obtained by the spring 27, which presses the main gear disc 4, which is slidably mounted on the gear spindle 2 with the boss 5, in the direction of the disc 3. If desired, this coupling pressure can be augmented with increasing loads by a coupling with inclined surfaces in the boss 5. The coupling pressure for the clutch coupling 28 is delivered by the second coupling spring 27a.

For enabling a reversing of the sense of rotation of the driven spindle 2, if desired, for instance for vehicles which must also be able to ride backward, the control rod 12 is displaceable by hand in such a manner that the housing 10 with the friction wheels 6 and 7 passes to the other side of the center of the disc 3. For this purpose, the rod 12 is provided with a lateral projection 41 which cooperates with a slot 42 of the hand lever 43, turning round the center 44 of a disc segment 45 with teeth 46, in respect of which the lever can be displaced and fixed.

As it is impossible, or in any way not advisable, to displace the set of friction wheels beyond the center of the driving disc during running of the gear discs, for changing over from forward to backward drive or inverse, declutching of the friction wheels can take place, for instance by means of a rocking lever, which is hingedly fixed at one end to the frame or gear housing and can be pressed with an intermediate point against a ball or pivot in the center of the disc 4 by manual actuation of the other end. In this way the disc 4 can be pressed away from the disc 3, against the action of the coupling spring 27, whereby the housing 10 with the friction wheels hangs released and free from the two main gear discs 3 and 4 and can easily be brought beyond the center of the driving disc.

Fig. 6 shows diagrammatically a same set of friction wheels as used in the device according to Fig. 5, however with the difference that the tooth wheels 31 and 32, with which the two friction wheels are mutually coupled, are of unequal diameter, so that at the same time the set of friction wheels, dependent on the side where the driving disc is arranged, will act as a multiplication or reduction gear.

In Fig. 7 finally a further set of friction wheels is diagrammatically shown of which the friction wheels 6 and 7 are coupled for rotation in opposite sense over an intermediate spindle 47 with a tooth wheel and a chain transmission. Instead of the chain transmission also a second tooth wheel transmission with a second intermediate spindle can be used. In this way, if necessary, still larger transmission ratios can be obtained between the two friction wheels.

In the embodiments according to the Figures 6 and 7, in which the circumferential speed of the two friction wheels 31 and 32 is mutually different, it has to be taken into account that when the housing 10 is rocked or tipped by displacement of the control rod 12, the displacements of the two friction wheels on the main gear discs will become unequal. Therefore the slower friction wheel can appropriately be separately suspended on an arm which is flexible with respect to the housing in a direction parallel to the surfaces of the two main gear discs. The lagging friction wheel then automatically comes in a more slanting position with respect to the two main gear discs, so that it can follow the other friction wheel. Furthermore in Fig. 7 also a pulley transmission can be used instead of a chain transmission.

Finally the mechanism 41—46, which enables attendance by hand, can be used for both driving directions, so that at any moment passing from automatic control to hand control is possible. Therefore the locking pawl which cooperates with the teeth 46, can be locked in released position, so that the hand lever 43 can freely move to and fro with the projection 41 under influence of the governor 21.

The invention is above described with reference to some embodiments, but is not limited to these examples of construction. Thus for reversing the driven spindle also a reversing gear, for instance with beveled tooth wheels can be used. Furthermore, instead of a centrifugal governor, an electromagnetic or other electrical governor can be applied, for instance consisting of a dynamo driven by one of the main gear spindles, which delivers current to a coil in the prolongation of the control rod 12, whereby this latter will be sucked more or less into the coil in proportion to the number of revolutions to be controlled and thus displaces the control rod in the necessary degree and direction.

Finally, the clutch coupling 28 and the governor 21 with the parts belonging to it, do not belong to the proper variable speed friction gear and therefore can also be omitted. The end 16 of the control rod 12 is than connected with a displacing and locking mechanism for attendance by hand.

What I claim is:

1. A variable speed friction gear including in combination, a main rotatably mounted drive spindle, a rotatably mounted driven spindle arranged parallel to the axis of the drive spindle and eccentrically thereof, main gear discs connected to and extending transversely of the adjacent ends of said spindles and positioned in opposed spaced relation with respect to each other, a longitudinally shiftable control rod mounted in spaced relation to the spaced discs and extending transversely of the axes of the spindles, a housing swingably connected to the control rod and positioned perpendicularly of the axis of the spindles and including a portion extending between the discs, friction wheels rotatably mounted with respect to the housing connected to said portion and coupled to each other for rotation in opposite directions and also frictionally engageable respectively and cooperating with the adjacent main gear discs, and means for axially displacing the control rod with the housing and friction wheels thereon.

2. A variable speed friction gear including in combination, a main rotatably mounted drive spindle, a rotatably mounted driven spindle arranged in the same horizontal plane of the drive spindle but eccentrically thereof, main gear discs connected to the adjacent ends of said spindles and positioned in opposed spaced relation with respect to each other, a longitudinally shiftable control rod arranged above the spaced discs and transversely of the axes of the spindles, a housing swingably suspended from the control rod and positioned perpendicularly of the axes of the spindles and between the discs, friction wheels rotatably mounted with respect to the housing and coupled to each other for rotation in opposite directions and also frictionally engageable respectively and cooperating with the adjacent main gear discs, and means for axially displacing the control rod with the housing and friction wheels thereon.

3. A variable speed friction gear as claimed in claim 1 in which means is provided for controlling the swinging movement of the housing on the control rod and for preventing longitudinal movement of the housing relative to the control rod.

4. A variable speed friction gear as claimed in claim 1 in which the friction wheels are mounted in such a manner that they engage each other and arms hingedly suspended from the casing for rotatably supporting the friction wheels.

5. A variable speed friction gear as claimed in claim 1 in which the driven spindle includes two aligning sections, a clutch coupling between said sections, the main friction gear being slidably and yieldably mounted on one of said sections, a centrifugal governor on the other of the driven spindle sections and wherein the means for axially displacing the control rod includes a regulating lever operatively connected with the governor, flexible connecting means between one end of the regulating lever and one end of the control rod for displacing the control rod in one direction, and means associated with the other end of the control rod for displacing the control rod in the opposite direction.

6. A variable speed friction gear according to claim 5 in which the means associated with the other end of the control rod includes an abutment member on the control rod and a series of adjustable return springs cooperating with the abutment.

JACOBUS JOANNES van LEEUWEN.

REFERENCES CITED

The following references are of record in the file of this patent:

UNITED STATES PATENTS

| Number | Name | Date |
|---|---|---|
| 777,663 | Christie | Dec. 20, 1904 |

FOREIGN PATENTS

| Number | Country | Date |
|---|---|---|
| 4,613 | Great Britain | Feb. 24, 1906 |
| 667,323 | France | June 10, 1929 |